United States Patent

[11] 3,589,222

[72] Inventor George W. Sederberg
 Highland Heights, Ky.
[21] Appl. No. 45,797
[22] Filed June 12, 1970
 Division of Ser. No. 726,657, May 6, 1968.
[45] Patented June 29, 1971
[73] Assignee Cincinnati Milacron Inc.
 Cincinnati, Ohio

[54] METHOD FOR CUTTING MATERIAL
 14 Claims, 26 Drawing Figs.
[52] U.S. Cl. .................................................. 83/49,
 83/424, 83/427, 83/428, 83/555, 83/563, 83/925c
[51] Int. Cl. .................................................. B26d 1/06
[50] Field of Search ........................................ 83/49, 424,
 427, 428, 555, 563, 925 CC

[56] References Cited
 UNITED STATES PATENTS
 3,184,158 5/1965 Beeren et al. ................. 234/3
 3,245,295 4/1966 Mueller ....................... 83/428 X
 3,477,322 11/1969 Berber et al. ................. 239/515

*Primary Examiner*—James M. Meister
*Attorney*—Jr. Leach

ABSTRACT: A material cutting machine has a reciprocating cutting blade mounted for cutting material, which is movable both transversely and longitudinally relative to the cutting blade. Means, which does not reciprocate with the cutting blade but moves with the cutting blade when it is lifted upwardly from the material or moved downwardly into the material, provides a guide for the blade during cutting. The cutting blade has its lower end sharpened or the lower end of the guide means sharpened or both are sharpened so that the material is pierced to permit entry of the cutting blade and the guide means into the material. The lower ends of both the guide means and the cutting blade are supported by support means beneath the material. The support means is rotated simultaneously with the cutting blade so that the support means is maintained in the desired alignment with the cutting blade when the heading of the cutting blade is changed.

INVENTOR
GEORGE W. SEDERBERG

BY Frank C. Leach Jr
ATTORNEY

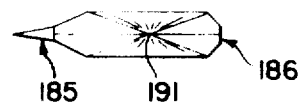
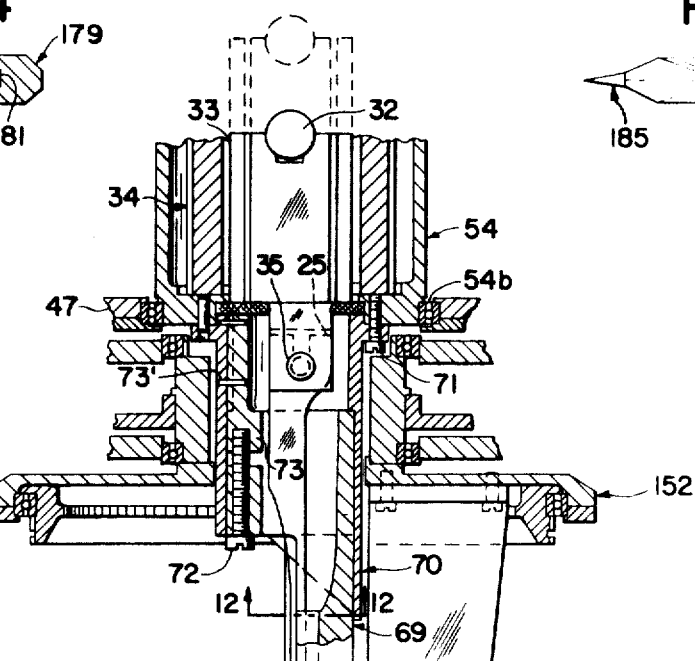
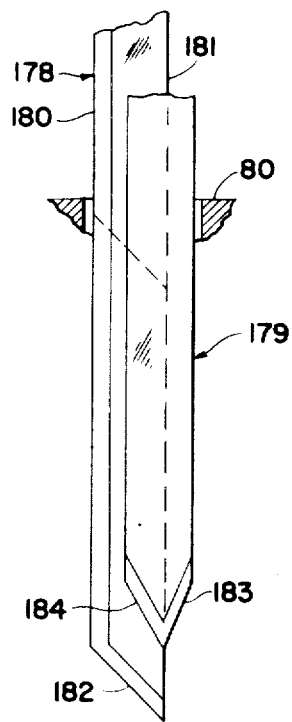
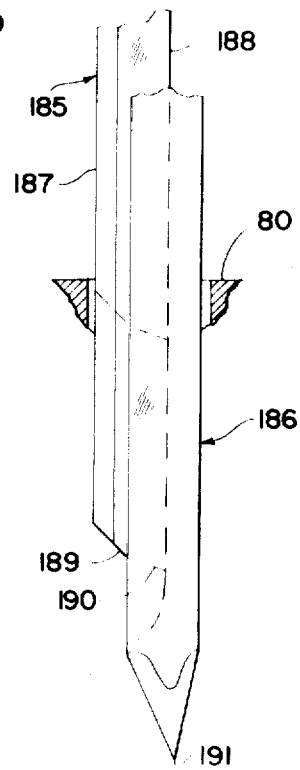

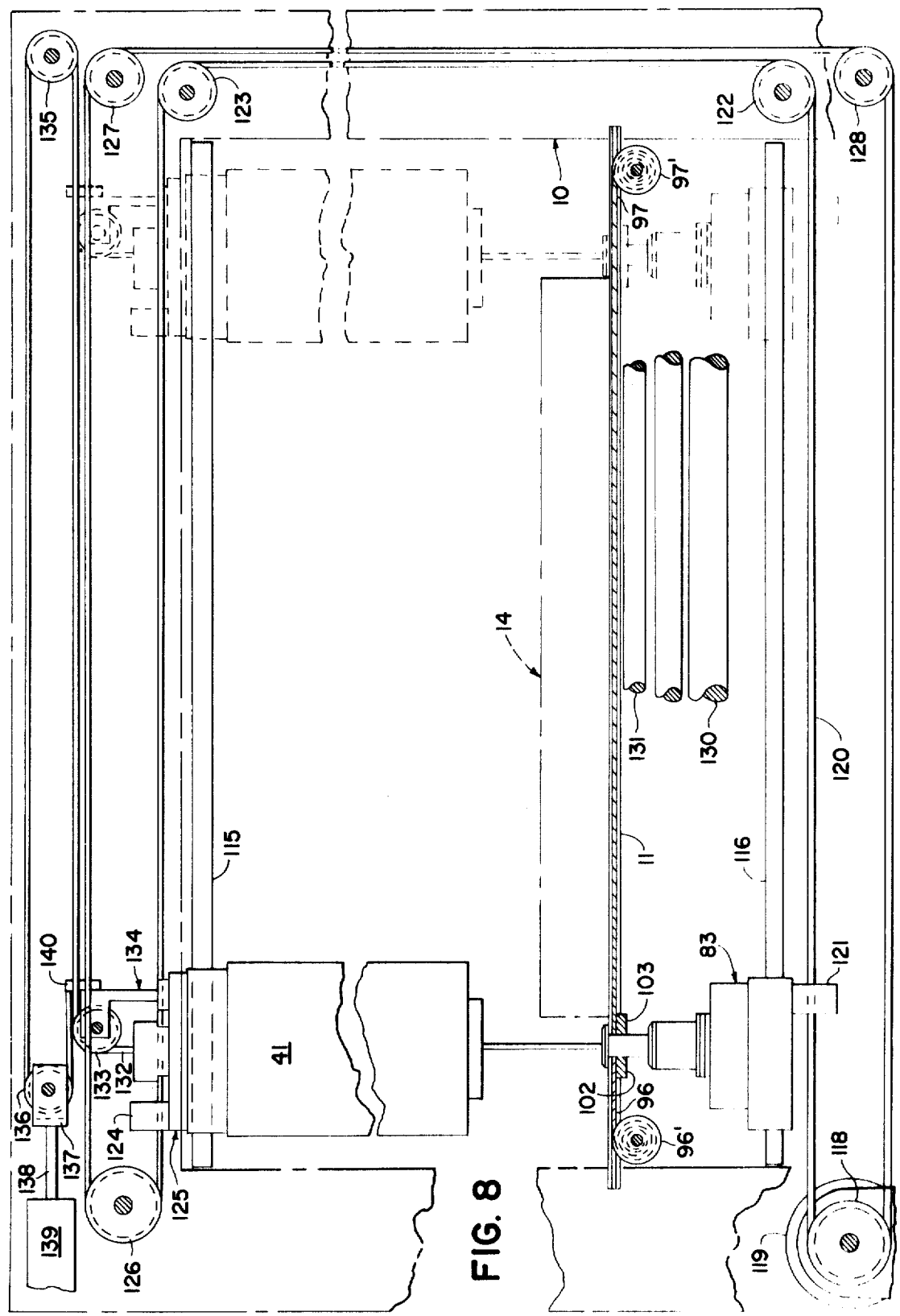

METHOD FOR CUTTING MATERIAL

This is a division of application Ser. No. 726,657, filed May 6, 1968.

Material cutting means have previously been suggested in which there is universal movement between the material, which is being cut, and the cutting means whereby there is relative longitudinal and transverse movement between the material and the cutting means. In these previously suggested machines, it has always been necessary to form an entrance cut into material to begin forming the pattern in the material. This also has caused some recutting along a previously cut line in the material to produce the desired pattern in the material being cut.

The requirement of the entrance cut into the pattern resulted in some of the material being wasted. Furthermore, it increased the time for forming the pattern. Additionally, portions of the material were cut loose from the remainder of the material so that the material tended to slide unless other suitable means were employed to prevent this sliding during cutting of the material.

The present invention satisfactorily overcomes the foregoing problems by permitting the cutting of a complete pattern in material by a cutting blade, which is movable both longitudinally and transversely relative to the material being cut, without the necessity of an entrance cut in the material. The present invention accomplishes this by utilizing a reciprocating cutting blade of a unique configuration and a nonreciprocating guide means of unique configuration in which the cutting blade and/or the guide means pierces the material at any desired point. Therefore, to reach the starting point of the pattern, it is not necessary to form an entrance cut in the material since the piercing edge of the cutting blade and/or the guide means for use in carrying out the method of the present invention may be positioned at the exact starting point of the pattern rather than having to be progressed to the starting point through forming an entrance cut in the material.

Because of the reciprocating cutting blade and/or the guide means being able to pierce the material being cut, there is no necessity for recutting along a previously cut pattern to reach another point. Instead, with the material cutting machine for carrying out the method of the present invention in which the reciprocating cutting blade and/or the guide means has a piercing edge, the cutting blade and the guide means are merely lifted from one position and transported to another position exterior of the material through moving the cutting blade along with the guide means and/or the material and then returned into engagement with the material at the point at which the pattern is to continue.

In the previously suggested material cutting machine, it has been found that a reciprocating cutting blade is the most satisfactory configuration for the cutting means to have a long life. However, in order to maintain the reciprocating cutting blade in the desired vertical plane during cutting of the material, which is disposed in a substantially horizontal plane so as to be perpendicular to the cutting blade, it has been necessary to provide guide means for cooperation with the lower end of the reciprocating cutting blade.

In the previously suggested cutting machine utilizing a reciprocating cutting blade with the guide means, the guide means has been supported at all times within support means, which are disposed beneath the support means for the material being cut. The support means for the guide means has been rotatable with the cutting blade when the heading of the cutting blade has been changed to maintain the guide means in alignment with the cutting blade.

Accordingly, in order to maintain the support means properly aligned with the cutting blade and to permit the guide means to move with the cutting blade through the material during cutting, it has been necessary to form an entrance cut in the material for this reason too. Thus, there must always be a cut formed in the material in the previously suggested cutting machine to permit the guide means to move with the cutting blade.

The present invention satisfactorily eliminates the requirement for the guide means to have to follow a cut in the material. By utilizing the uniquely configured cutting blade and guide means of the present invention in which the cutting blade and/or the guide means has its lower edge sharpened, the guide means is removable from its lower support means during certain operations of the material cutting machine. As a result, the present invention eliminates any need for the guide means to have to be moved through a cut in the material unless cutting is occuring.

An object of this invention is to provide a method for cutting a pattern in material by a reciprocating cutting blade without having to make any cuts other than those required by the pattern design.

Other objects of this invention will be readily perceived from the following description, claims, and drawings.

This invention relates to a method for forming a pattern in material with a reciprocating cutting blade having cutting surfaces on both its leading edge and an edge connecting the ends of its leading and trailing edges remote from its reciprocating means in which relatively longitudinal and transverse movement between the material and the cutting blade may occur. The method comprises positioning the material in a plane substantially perpendicular to the reciprocating plane of the cutting blade and disposing the cutting blade out of cutting engagement with the material but at the start of the pattern. The cutting blade is then inserted into the material at the starting point of the pattern by piercing the material. The cutting blade is removed from cutting engagement with the material when cutting of a particular portion of the pattern that is disconnected from the remainder of the pattern is completed.

The attached drawings illustrate preferred embodiments of the invention, in which:

FIG. 3 is a side elevational view, partly in section, of the cutting blade used in carrying out the method of the present invention, the guide for cooperation with the cutting blade, and the upper support structure therefor;

FIG. 8 is an elevational view, partly in section, of the cutting blade support structure and the mechanisms for lifting the cutting blade from cutting engagement with the material and moving the cutting blade transversely;

Figure 19:
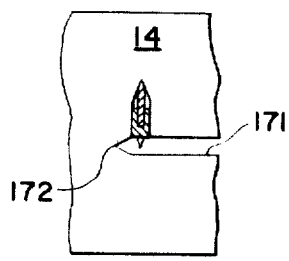
FIG. 19 is a view, similar to FIG. 18, but showing a cut formed in the material transversely to the previous cut.
Figure 20:
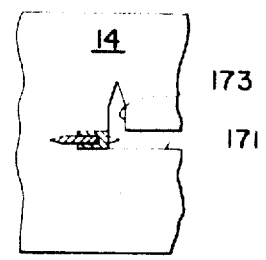
Figure 21:
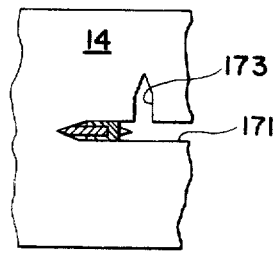
Figure 22:
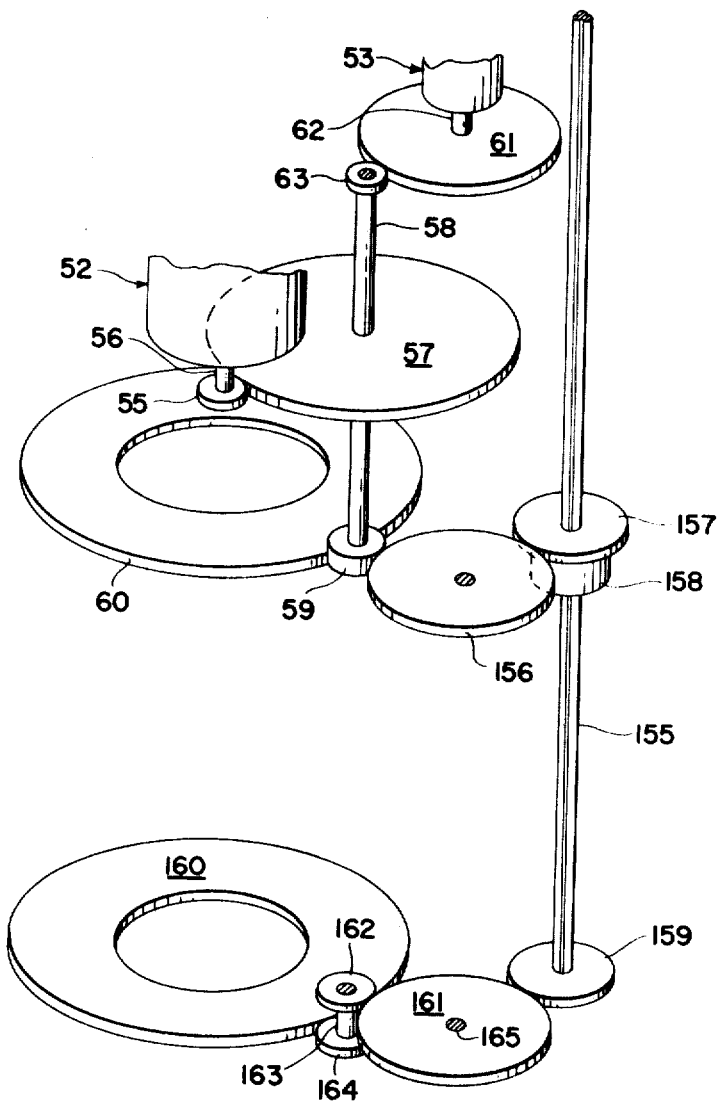

FIG. 20 is a view, similar to FIG. 19, but showing the cutting blade and guide lifted from cutting engagement with the material and moved to a position away from the transverse cut with the cutting blade and guide rotated 90° from the position of FIG. 19 and the material advanced longitudinally relative to the cutting blade and the guide whereby the cutting blade is disposed at the end of the longitudinal cut;

FIG. 21 is a view, similar to FIG. 20, but showing the longitudinal cut having been cut further beyond the transverse cut;

FIG. 22 is a schematic perspective view showing the gearing relation between various portions of the material cutting machine;

FIG. 23 is a side elevational view, partly in section, of a portion of another embodiment of the cutting blade and its guide for utilization with the material cutting machine for carrying out the method of the present invention;

FIG. 24 is a sectional view of the cutting blade and guide of FIG. 23;

FIG. 25 is a side elevational view, partly in section, of a portion of another modification of the cutting blade and its guide for utilization with the material cutting machine for carrying out the method of the present invention, and FIG. 26 is a bottom plan view of the guide and cutting blade of FIG. 25.

Figure 1:
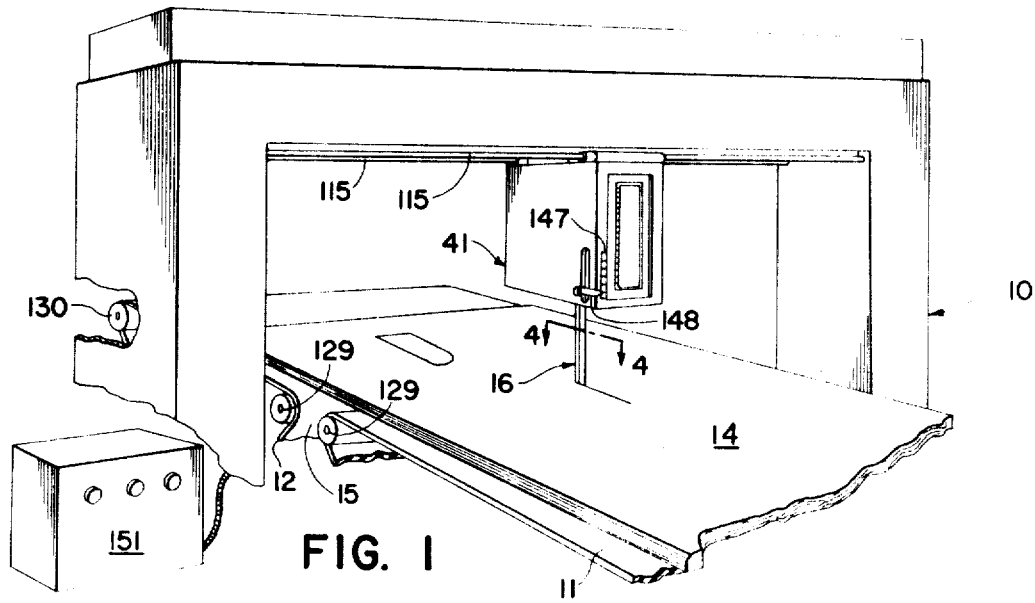
FIG. 1 is a perspective view of a portion of the material cutting machine for carrying out the method of the present invention with some parts omitted for clarity purposes.

Referring to the drawings and particularly FIG. 1, there is shown a material cutting machine for carrying out the method of the present invention. The material cutting machine includes stationary support means such as a bridge 10. A pair of endless bands or belts 11 and 12 is adapted to support material 14 thereon.

The endless bands 11 and 12, which are flexible and formed of any suitable material, are adapted to be driven in unison to move the material 14 thereon in a longitudinal direction and relative to the bridge 10. The endless bands 11 and 12 are spaced from each other to form a transverse passage or throat 15 therebetween for reception of a cutting blade 16.

Figure 4:
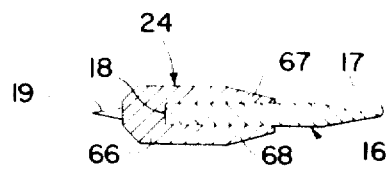
FIG. 4 is an enlarged cross-sectional view of the cutting blade and the guide with the cutting blade disposed within the guide and taken along line 4–4 of FIG. 1.

The cutting blade 16 has its leading edge 17 (see FIG. 4) sharpened along both sides to a point to form a cutting surface along its entire length. The cutting blade 16 has its trailing edge 18 connected at its bottom end to the bottom end of the leading edge 17 by a connecting edge 19 (see FIG. 3).

The connecting edge 19 includes a first portion 20, which extends downwardly from the bottom end of the leading edge 17 at an angle thereto toward the trailing edge 18. As shown in FIG. 3, the portion 20 of the connecting edge 19 terminates in substantially the same vertical plane as the trailing edge 18 of the cutting blade 16. It is necessary that the portion 20 extend at least this far to the rear from the leading edge 17; if desired, it could extend further.

The connecting edge 19 also includes a second portion 21, which extends upwardly from the first portion 20 and also away from the leading edge 17. The second portion 21 has a third portion 22 of the connecting edge 19 extending upwardly therefrom and disposed substantially parallel to the leading edge 17 and the trailing edge 18 of the cutting blade 16. The connecting edge 19 has a fourth portion 23 extending inwardly and upwardly from the top of the third portion 22 to the bottom end of the trailing edge 18.

Each of the portions 20, 21, and 22 of the connecting edge 19 is sharpened to a point in the same manner as the leading edge 17. Thus, the cutting blade 16 has both the leading edge 17 and three portions of the connecting edge 19 sharpened to provide cutting surfaces whereby cutting of the material 14 occurs when the connecting edge 19 is moved into engagement with the material 14. Thus, the connecting edge 19 forms a piercing edge to penetrate the material 14 when the cutting blade 16 is inserted into the material 14.

Accordingly, by positioning a guide 24 with its lower end disposed above the connecting edge 19 of the cutting blade 16, the material 14 may be pierced by the cutting blade 16 before the guide 24 enters the material 14. The guide 24 does not reciprocate with the cutting blade during cutting of the material 14 but is supported at its lower end. However, when the cutting blade 16 is lifted from engagement with the material 14, the guide 24 also is lifted. Thus, the guide 24 does not require any entrance cut in the material 14 for it to enter the material 14 since the guide 24 enters the material 14 through the piercing cut made by the connecting edge 19 of the cutting blade 16 in the material 14.

The cutting blade 16 has its upper end 25 (see FIG. 3) attached through suitable connecting means to a motor 26 (see FIG. 2), which causes reciprocation of the cutting blade 16 with respect to the material 14 supported on the endless bands 11 and 12 to cut the material 14. The motor 26 has a flywheel or crank wheel 27 attached to its shaft. The flywheel 27 has a spherical member 29 extending outwardly therefrom for disposition in an opening in the upper end of a hollow connecting rod 31 to form a spherical joint between the upper end of the connecting rod 31 and the spherical member 29. The lower end of the hollow rod 31 has a ball 32 extending therefrom for reception within a recess in a slider 33 to form a ball joint between the lower end of the hollow connecting rod 31 and the upper end of the slider 33.

Figure 5:
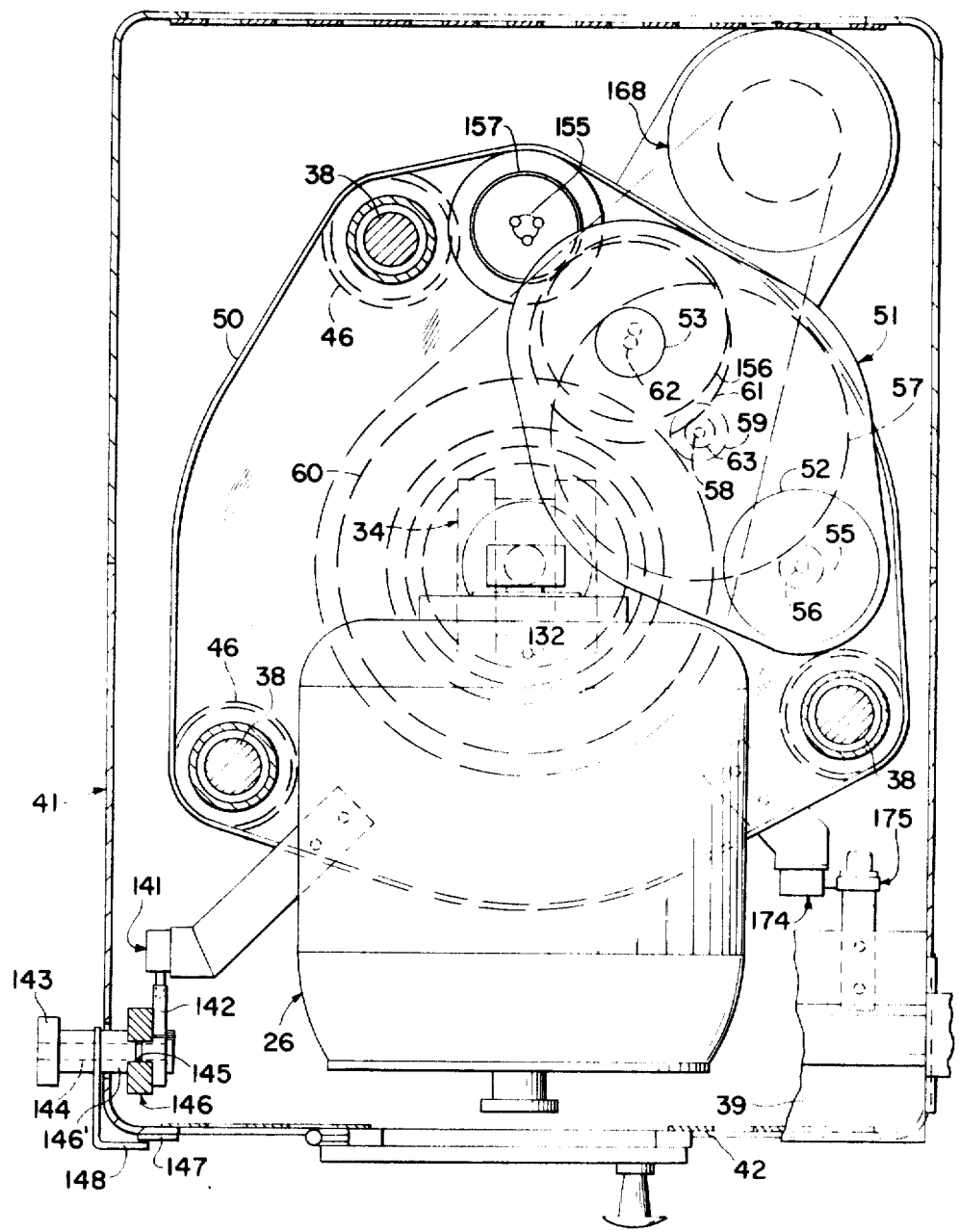
FIG. 5 is a top plan view, partly in section, of the material cutting machine for carrying out the method of the present invention showing a portion of the gearing arrangement for rotating the cutting blade.

A rotary box 34 (see FIGS. 3 and 5), which is adapted to be rotated as will be described hereinafter, is rectangular shaped with two opposite portions having V-shaped passages extending longitudinally therethrough to receive V-shaped ways on opposite sides of the slider 33. Thus, the slider 33 is slidably disposed within the rotary box 34, which functions as a guide member for the slider 33. The lower end of the slider 33 has the upper end 25 of the cutting blade 16 fixedly secured thereto by suitable means 35 such as a screw for movement therewith.

Accordingly, the motor 26 is connected to the cutting blade 16. As the motor 26 rotates, the cutting blade 16 is reciprocated.

The motor 26 is fixedly secured to an upper portion 36 (see FIG. 2) of a vertically movable frame 37 for support thereby. The frame 37 is slidably supported on rods 38, which extend between an upper plate or disc 39 and a grinding wheel frame 44. The upper plate 39 forms the top wall of a housing 41 within which the motor 26 and the connecting means between the cutting blade 16 and the motor 26 are disposed. A lower plate 40 is fixedly secured to front wall 42 of the housing 41 and to the grinding wheel support frame 44.

The upper end of each of the rods 38 in permanently secured to the upper plate 39 through being pinned to a bushing 43, which is welded to the plate 39. The lower end of each of the rods 38 is permanently secured to the grinding wheel frame 44 by a pin. Thus, the grinding wheel frame 44 is fixedly secured to the upper plate 39 and supported thereby through the rods 38 being permanently secured to the upper plate 39 and the grinding wheel frame 44.

Ball bearing bushings 45 which surround the rods 38, are disposed within upstanding cylindrical parts 46 of the lower portion 47 of the vertically movable frame 37. The lower end of each of the ball bearing bushings 45 is retained by a washer 48, which is fixedly secured to the lower portion 47 of the frame 37. The upper end of the ball bearing bushing 45 is retained by a washer 49, which is disposed between the top surface of the surrounding cylindrical part 46 and the bottom surface of the upper portion 36 of the frame 37. The ball bearing bushings 45 prevent shaking or vibration of the vertically movable frame 37 during any movement of the frame 37 away from the rest position (This is when the washers 48 are disposed on the top of the grinding wheel frame 44 as shown in FIG. 2.).

Figure 2:
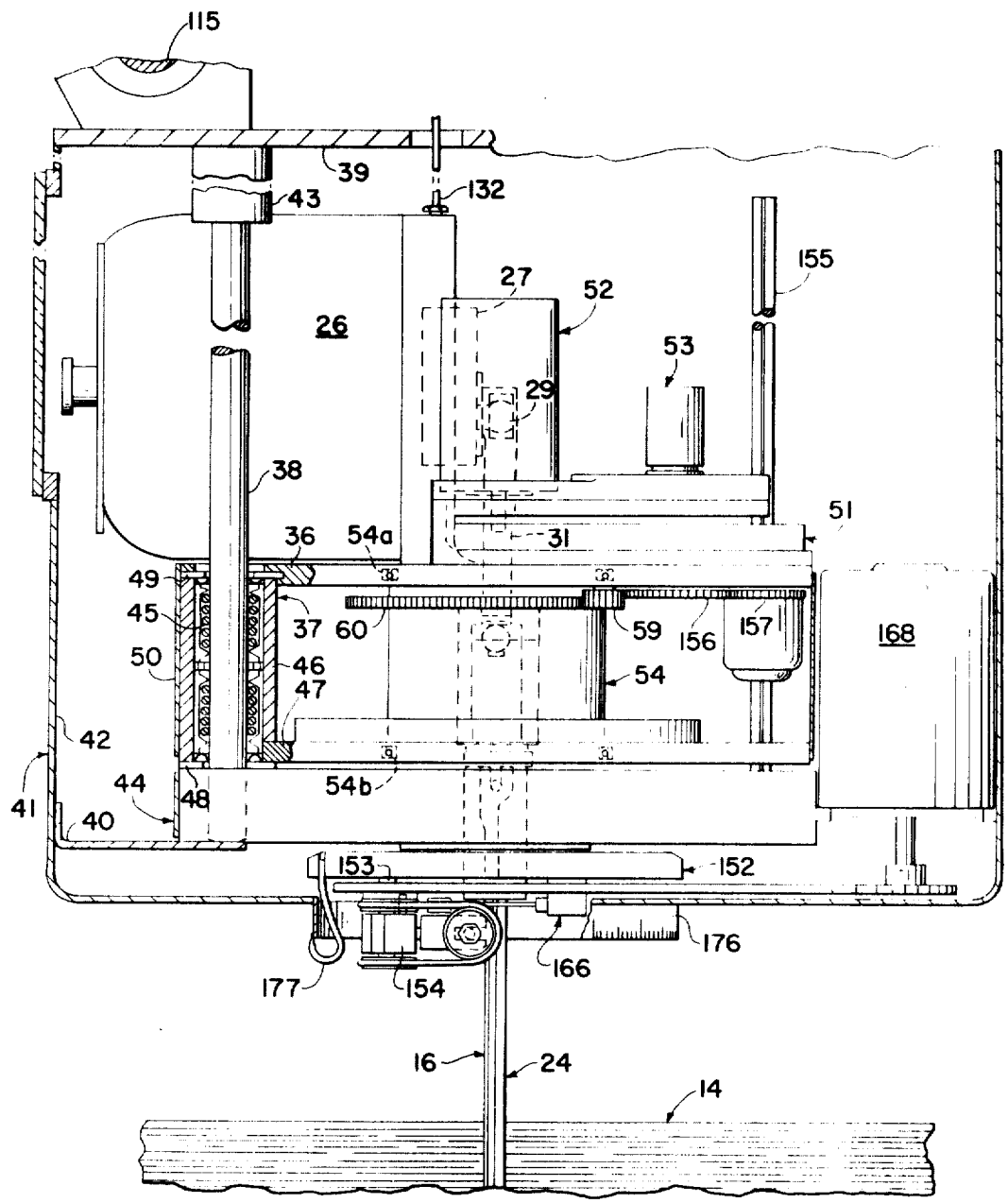
FIG. 2 is a side elevational view of a portion of the material cutting machine for carrying out the method of the present invention illustrating the relation of various parts of the cutting blade structure with rod 38 and cooperating structure not in their true positions, corresponding to FIG. 5, for clarity purposes and some parts omitted for clarity purposes.

As shown in FIG. 2, the upper portion 36 and the lower portion 47 of the frame 37 are connected to each other by a thin, continuous member 50. The member 50 extends from the upper portion 36 to almost the bottom of the lower portion 47 to make the frame 37 unitary.

The vertically movable frame 37 has a gear box 51 fixedly disposed on the upper surface of the upper portion 36 of the frame 37 for vertical movement therewith. The gear box 51 fixedly supports a motor 52 and a feedback resolver 53 on its upper surface.

The rotary box 34 is adapted to be rotated by the motor 52. The drive from the motor 52 to the rotary box 34 is through a pinion gear 55 (see FIG. 22) on shaft 56 of the motor 52 meshing with a pinion gear 57 on a shaft 58, which is rotatably mounted within the gear box 51. The shaft 58 has a second pinion gear 59 meshing with a bull gear 60, which is fixedly secured to the upper end of the rotary box 34. Accordingly, whenever the motor 52 is energized, the rotary box 34 is rotated.

The lower end of the rotary box 34 is fixedly secured to a cylindrical housing 54, which surrounds the rotary box 34. With the bull gear 60 rotatably supported in the upper portion 36 of the frame 37 by a ball bearing assembly 54a and the lower end of the housing 54 rotatably supported in the lower portion 47 of the frame 37 by a ball bearing assembly 54b, the rotary box 34 is rotatably supported between the upper portion 36 and the lower portion 47 of the vertically movable frame 44.

The resolver 53 provides an electrical feedback signal to indicate the amount of rotation of the motor 52. Thus, a pinion gear 61 is mounted on shaft 62 of the resolver 53 to rotate the resolver 53 with the motor 52 due to the pinion gear 61 meshing with a pinion gear 63 on the shaft 58.

As previously mentioned, the rotary box 34 functions as the guide member for the slider 33. Thus, since the cutting blade 16 is fixedly secured to the slider 33, which slides within the rotary box 34, rotation of the rotary box 34 rotates the cutting blade 16 about the axis of the rotary box 34. The axis of the rotary box 34 is vertically aligned with an axis passing through a point adjacent to the leading edge 17 of the cutting blade 16. Because of the spherical connection between the slider 33, which slides in the rotary box 34, and the connecting rod 31, reciprocation of the cutting blade 16 by the motor 26 continues to occur even when the rotary box 34 is being rotated.

The guide 24 must be supported for rotation with the rotary box 34 so as to maintain the guide 24 properly aligned with the cutting blade 16 during any rotation of the cutting blade 16. However, the guide 24 also must be capable of being lifted when the cutting blade 16 is lifted from cutting engagement with the material 14.

The guide 24 is U-shaped and includes a base portion 66 with sides 67 and 68 (see FIG. 4) to receive the cutting blade 16 therein for reciprocation relative thereto. The bottom end or edge of the sides 67 and 68 is preferably sharpened to a point in the same manner as the leading edge 17 and the portions 20, 21, and 22 of the connecting edge 19 of the cutting blade 16. This permits easier entry into the material 14 if the material 14 should resist entrance of the guide 24 even though the cut has been formed in the material 14 by the cutting blade 16.

Figure 11:
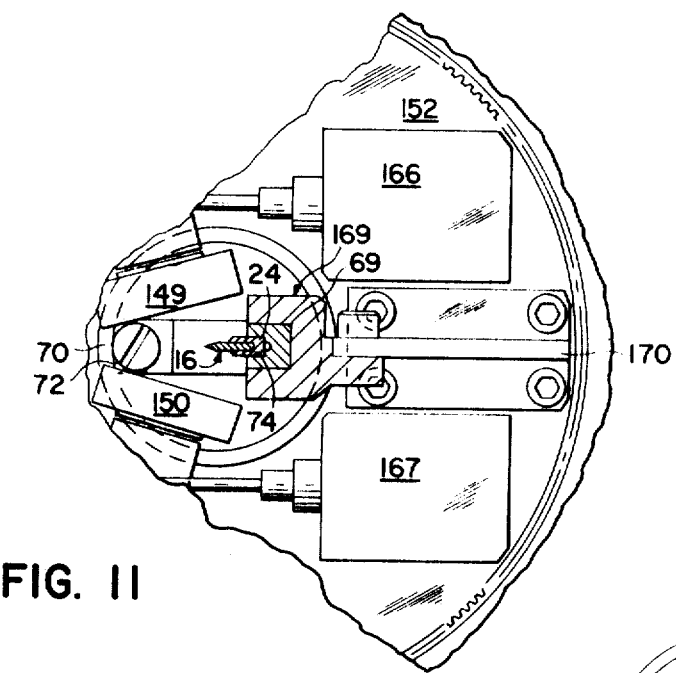
FIG. 11 is an enlarged fragmentary sectional view of the cutting blade, the guide, and support structure for the guide and taken along line 11–11 of FIG. 3.
Figure 12:
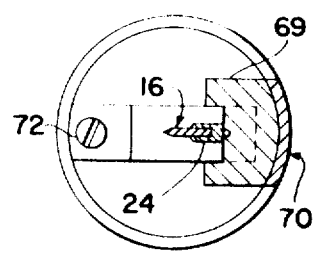
FIG. 12 is a sectional view of the cutting blade, the guide, and support structure for the guide and taken along line 12–12 of FIG. 3.

As shown in FIG. 3, the guide 24 is fixedly supported within an elongated member 69, which is secured to the rotary box 34 for rotation therewith, by being cemented thereto. The elongated member 69 has its upper end disposed within a substantially cylindrical shaped member 70, which is secured by suitable means such as screws 71 to the cylindrical housing 54 that is fixed to the rotary box 34. The elongated member 69 is attached to the substantially cylindrical shaped member 70 through a screw 72, which is threadedly connected to a key 73 that is fixedly secured to the member 70 by a pin 73'. Accordingly, any rotation of the rotary box 34 is transmitted to the elongated member 69 through the member 70. Since the guide 24 is fixedly disposed within a U-shaped slot 74 (see FIG. 11) in the member 69, any rotation of the rotary box 34 is transmitted to the guide 24. Since rotation of the rotary box 34 also is transmitted to the cutting blade 16 through the slider 33, the guide 24 will rotate with the cutting blade 16 so as to be maintained in alignment therewith.

During cutting of the material 14, the lower end of the guide 24 is supported by a support block 80 (see FIG. 6) to maintain the reciprocating cutting blade 16 perpendicular to the material 14. Since both the cutting blade 16 and the guide 24 are lifted from the support block 80 when the cutting blade 16 is lifted to remove the cutting blade 16 from cutting engagement with the material 14, the cutting blade 16 and the guide 24 must slide relative to the support block 80 at this time. It is necessary for the support block 80 to rotate whenever the cutting blade 16 rotates to permit the guide 24 to rotate with the cutting blade 16 and to allow the cutting blade 16 and the guide 24 to be properly aligned at the desired heading. Accordingly, suitable structure is employed to rotate the support block 80 the same amount as the rotary box 34.

Figure 6:
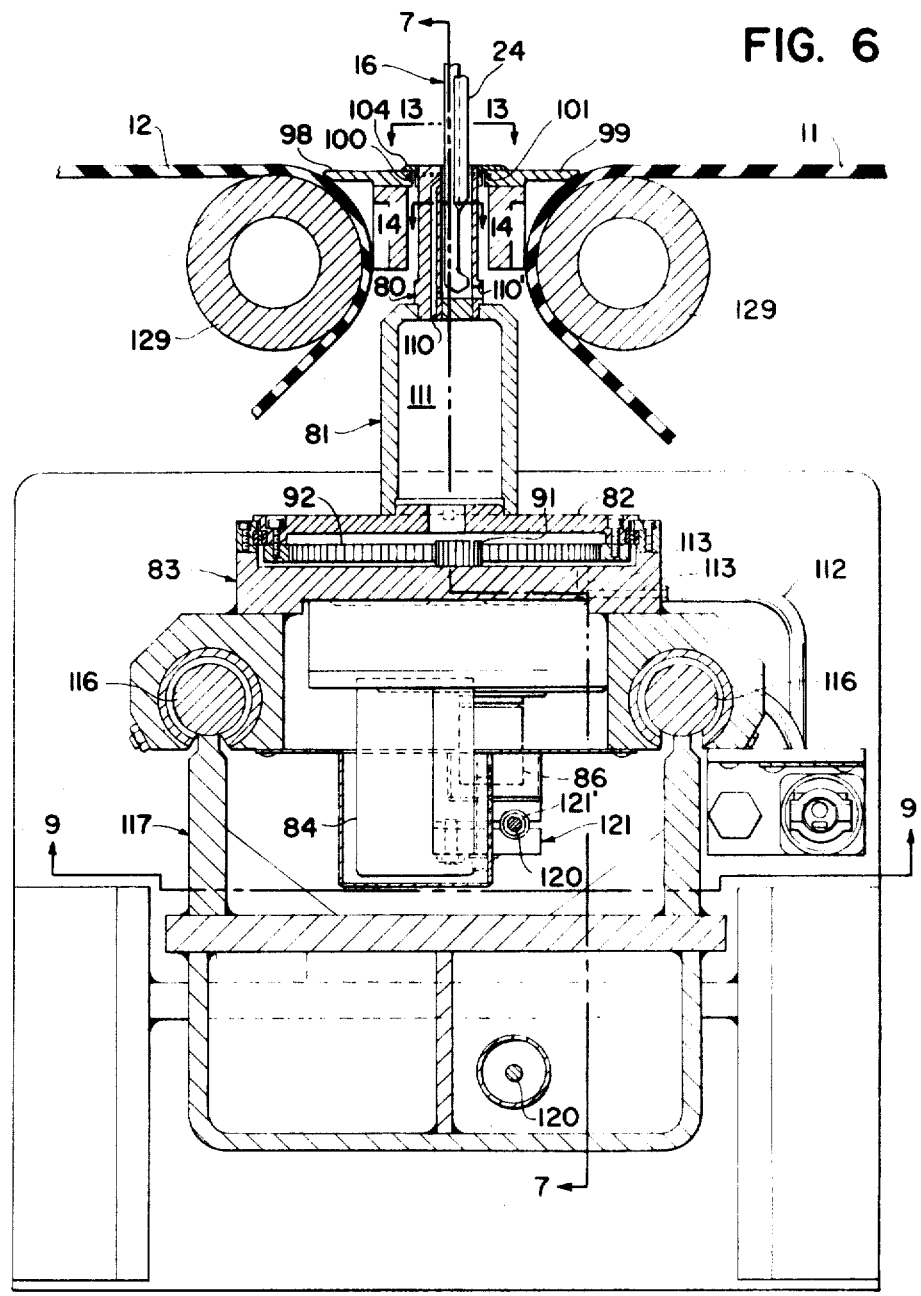
FIG. 6 is a sectional view showing the lower support structure for the cutting blade and the guide.
Figure 7:
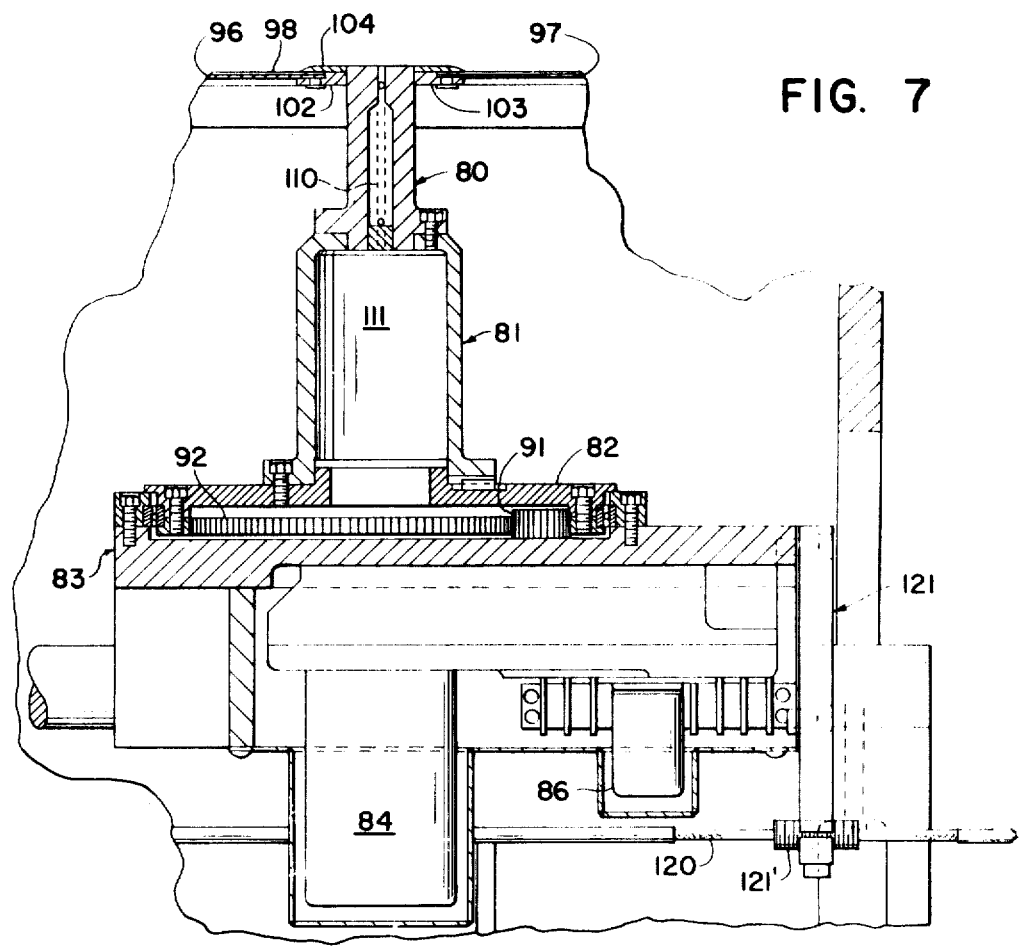
FIG. 7 is a sectional view of the structure of FIG. 6 and taken along line 7–7 of FIG. 6 with the cutting blade omitted for clarity purposes.

The support block 80 is carried by a hollow support member 81 through the lower end of the support block 80 being fixedly secured to the upper end of the hollow support member 81. As shown in FIGS. 6 and 7, the lower end of the hollow support member 81 is fixedly secured to an annular member 82, which is rotatably mounted on a lower saddle 83.

Figure 9:
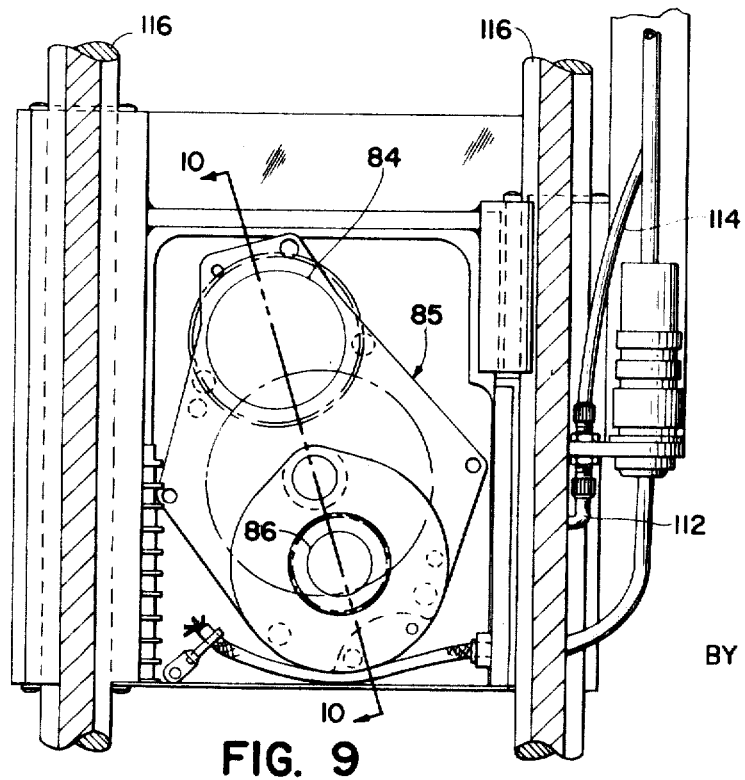
FIG. 9 is a plan view, partly in section, illustrating the drive arrangement for rotating the lower support structure for the guide and the cutting blade and taken along line 9–9 of FIG. 6.
Figure 10:
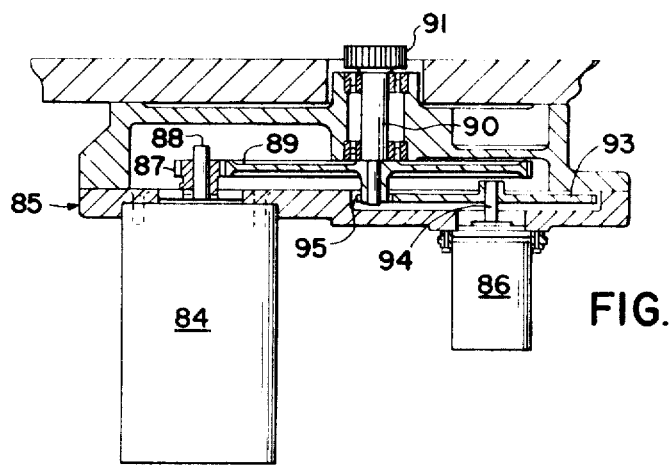
FIG. 10 is a sectional view of the gear box for the lower support structure and taken along line 10–10 of FIG. 9.

The annular member 62 is adapted to be rotated by a motor 84, which is fixedly supported on a gear box 85 (see FIGS. 9 and 10). The gear box 85 is fixedly mounted on the lower saddle 83. The gear box 85 also supports a feedback resolver 86.

The drive from the motor 84 to the annular member 82 is through a pinion gear 87 (see FIG. 10) on shaft 88 of the motor 84 meshing with a pinion gear 89 on a shaft 90, which is rotatably mounted within the gear box 85. The shaft 90 has a second gear 91 mounted thereon and meshing with a bull gear 92, which is fixedly secured to the lower portion of the annular member 82 as shown in FIGS. 6 and 7. Accordingly, whenever the motor 84 is energized, the annular member 82 is rotated whereby the support block 80 is rotated.

It should be understood that the motor 84 is energized simultaneously with the motor 52. Thus, this insures that the support block 80 rotates whenever the cutting blade 16 and the guide 24 are rotated.

Therefore, when the motors 52 and 84 are energized, rotation of the cutting blade 16 and the guide 24 occurs together with the support block 80. Because of the spherical joint at the upper end of the hollow connecting rod 31 and the ball joint at the lower end of the hollow connecting rod 31, power from the motor 26 still reciprocates the cutting blade 16.

The resolver 86 provides an electrical feedback signal to indicate the amount of rotation of the motor 84. Thus, a pinion gear 93 is mounted on shaft 94 of the resolver 86 to rotate the resolver 86 with the motor 84 due to the pinion gear 93 meshing with a pinion gear 95 on the shaft 90.

The structure for closing the throat or passage 15 includes a pair of spring tapes 96 and 97 (see FIGS. 7 and 8) that are similar to those shown and described in the copending patent application of Edward C. Bruns for "Gap Closer For Material Cutting Machine," Ser. No. 636,964, filed May 8, 1867, now U.S. Pat. No. 3,465,630, and assigned to the same assignee as the assignee of the present application. As more particularly shown and described in the aforesaid Bruns application, each of the spring tapes 96 and 97 is wound around drums 96' and 97' (see FIG. 8), respectively. The width of each of the spring tapes is greater than the distance between throat way sections 98 and 99.

As shown in FIG. 6, the throat way sections 98 and 99 have slots 100 and 101, respectively, therein to receive the opposite edges of the tapes 96 and 97. The end of the tape 96 is secured to a member 102 (see FIG. 7), which abuts against the support block 80, and the end of the tape 97 is secured to a member 103, which also abuts against the support block 80 and is diametrically disposed to the member 102.

Figure 13:
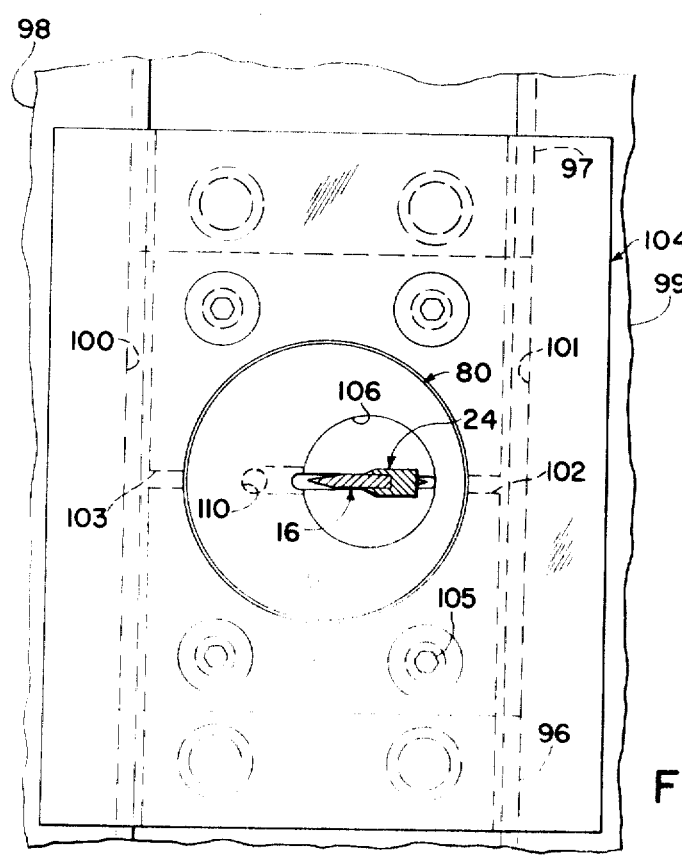
FIG. 13 is a top plan view, partly in section, of a support block for the cutting blade and the guide adjacent the upper surface of the support block and taken along line 13—13 of FIG. 6.
Figure 14:
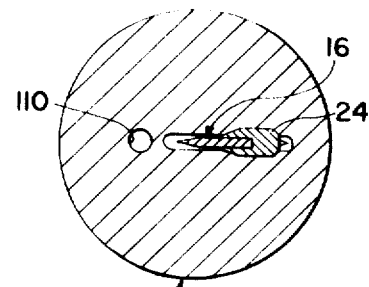
FIG. 14 is a sectional view of the support block illustrating the relationship of the cutting blade and the guide within the support block in which the lower end of the cutting blade and the guide are disposed and taken along line 14—14 of FIG. 6.

A rectangular shaped member 104 (see FIG. 6), which has the members 102 and 103 fixedly secured thereto by fastening means 105 (see FIG. 13), overlies portions of the throat way sections 98 and 99 adjacent to the gap between the throat way sections 98 and 99 and is slidable on the throat way sections 98 and 99. Thus, the tapes 96 and 97 move with the support block 80 during any transverse movement of the support block 80 in the passage 15 as more particularly described in the aforesaid Bruns application.

With the rectangular shaped member 104 having a size sufficient to completely close the gap between the throat way sections 98 and 99 and the support block 80 as shown in FIG. 6 and the tapes 96 and 97 extending beneath the rectangular shaped member 104 as shown in FIG. 7, the only opening is a small opening 106 (see FIG. 13) within the support block 80 through which the lower end of the cutting blade 16 and the guide 24 extend into the support block 80. Therefore, the material 14 is easily moved from the endless band 11 to the endless band 12 and vice versa without either end of the material 14 being disrupted in its movement by the transverse passage 15.

As shown in FIGS. 6 and 7, the member 104 has a tapered surface from its outer edge towards its center. This permits easy movement of the material from the throat way section 98 or 99 to the member 104 without the material having its longitudinal movement retarded.

Since particles of the material 14 may fall downwardly into the support block 80, it is desired to be able to remove these particles of the material 14. Thus, a suitable air flow arrangement is provided to direct air into the interior of the support block 80 to remove any particles of the material 14 therefrom.

The air flow arrangement includes an air passage 110 (see FIG. 6) in the support block 80. The air passage 110 communicates with an area adjacent the lower end of the guide 24 and an area adjacent the lower end of the cutting blade 16. The air flowing through the passage 110 forces particles of the material 14 upwardly through the open upper end of the support block 80 and through an opening 110' in the support block 80 adjacent the lower end of the cutting blade 16.

The lower end of the air passage 110 communicates with a pressurized chamber 111 in the hollow support member 81. The pressurized chamber 111, which communicates with the interior of the lower saddle 83, has a flexible hose 112 supplying air thereto through passages 113 in the lower saddle 83 to the interior of the lower saddle 83. The hose 112 is connected through a hose 114 (see FIG. 9) to a suitable source of air under pressure. The hoses 112 and 114 are carried by the lower saddle 83.

Figure 15:
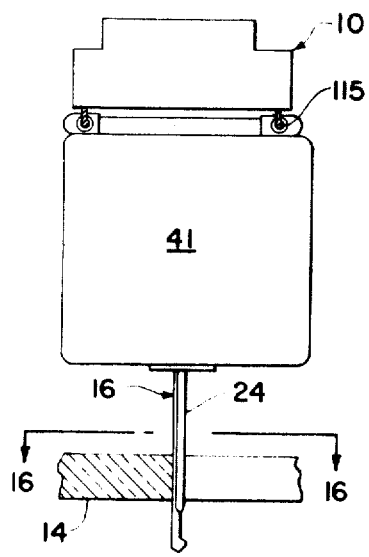
FIG. 15 is a side elevational view, partly in section, showing the cutting blade in cutting engagement with the material and forming a cut in the material.
Figure 17:
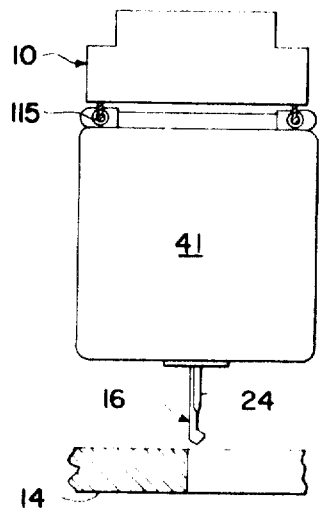
FIG. 17 is a view, similar to FIG. 15, but showing the cutting blade removed from cutting engagement with the material.

As shown in FIGS. 1, 15, and 17, the housing 41 is slidably supported on a pair of horizontally disposed and transversely extending guide rails or ways 115, which are supported and carried by the bridge 10. Accordingly, movement of the housing 41 along the cylindrical ways 115, which have their longitudinal axes substantially parallel to the transverse passage 15, causes movement of the cutting blade 16 through the transverse passage or throat 15, which is formed between the endless bands 11 and 12.

The housing 41 carries ball bearing bushings that ride on the ways 115. These permit the housing 41 to slide on the ways 115.

The lower saddle 83 is adapted to slide along lower guide rails or ways 116 (see FIG. 6), which are supported and carried by lower support means 117 of the bridge 10. The lower saddle 83 also carries ball bearing bushings that ride on the cylindrical ways 116 so as to permit the lower saddle 83 to slide on the ways 116.

The lower cylindrical guide ways 116 have their longitudinal axes disposed substantially parallel to the longitudinal axes of the upper ways 115. Accordingly, the housing 41 and the lower saddle 83 can be moved parallel to each other in a transverse direction relative to the endless bands 11 and 12.

An apparatus for moving the housing 41 and the lower saddle 83 so that the cutting blade 16 traverses the transverse passage or throat 15 is shown in FIG. 8. The apparatus includes a drum 118, which is driven by a reversible motor 119. A continuous cable 120 has its ends attached to the drum 118 and is wound around the drum 118 by being disposed in helical grooves therein.

The cable 120 extends from the drum 118 beneath the lower saddle 83 and is fixedly attached thereto by clamping means 121, which extends downwardly from the lower saddle 83 (see FIG. 7) and is fixedly mounted on the lower saddle 83. The clamping means 121 cooperates with an enlarged metallic member 121' on the cable 120. After leaving the clamping means 121 of the lower saddle 83, the cable 120 passes around a pulley 122, which is rotatably mounted on the bridge 10.

The cable 120 extends upwardly within one of the hollow support standards of the bridge 10 and passes around a pulley 123, which is rotatably mounted on the bridge 10. The cable 120 then passes through clamping means 124 in an extension 125 of the housing 41 and is fixedly secured to the clamping means 124 in substantially the same manner as shown and described for the clamping means 121.

The cable 120 then passes around a pulley 126, which is rotatably mounted on the bridge 10. The cable 120 next extends around a pulley 127, which is rotatably mounted on the bridge 10 above the pulley 123. From the pulley 127, the cable 120 extends downwardly within the hollow support standard of the bridge 10 through which it extended upwardly. The cable 120 then extends around a pulley 128, which is rotatably mounted on the bridge 10 beneath the pulley 122, and returns to the drum 118.

Accordingly, actuation of the motor 119, which is preferably hydraulic, causes rotation of the drum 118 to move the housing 41 and the lower saddle 83 together along the upper ways 115 and the lower ways 116, respectively, whereby the cutting blade 16 traverses the transverse passage or throat 15 to cut the material 14, which is supported on the endless bands 11 and 12. In order to move the cutting blade 16 from the solid line position of FIG. 8 to the phantom line position, the drum 118 is rotated clockwise. This winds the lower part of the cable 120 on the drum 118 and unwinds the upper part of the cable 120.

Each of the endless bands 11 and 12 is received over a pair of horizontally spaced guide rollers 129 and 130 (see FIG. 1) with the rollers 129 for the bands 11 and 12 being disposed adjacent the transverse passage or throat 15. A plurality of horizontally spaced support rollers 131 (one shown for the band 11 in FIG. 8) is supported for rotation between parallel, side plates or rails of the table structure and is adapted to support the endless band 11 as more particularly shown and described in my copending patent application for "Material Cutting Machine Having Reciprocating Cutting Blade," Ser. No. 636,965, filed May 8, 1967, now abandoned, and assigned to the same assignee as the assignee of the present application.

The endless band 12 is similarly supported by a plurality of horizontally spaced support rollers. These rollers are supported for rotation between parallel, side plates or rails as more particularly shown and described in my aforesaid application.

The endless bands 11 and 12 are driven in unison to move the material 14 in either of the longitudinal directions through rotation of the drive rollers by a motor as more particularly shown and described in my aforesaid application. Thus, the material 14 may be moved longitudinally relative to the cutting blade 16 through driving of the endless bands 11 and 12 in unison.

As previously mentioned, the frame 37, which carries the reciprocating motor 26 thereon, is slidably mounted on the rods 38. The frame 37 and the structure supported thereby are adapted to be moved from the position of FIG. 2 upwardly through actuation of a cable 132.

As shown in FIG. 2, one end of the cable 132 is attached to the motor 26. Accordingly, when the cable 132 is pulled upwardly, the frame 37, the motor 26, the cutting blade 16, the connecting means between the cutting blade 16 and the motor 26, the gear box 51 and related structure, the rotary box 34 and related structure, the member 70, the elongated member 69, and the guide 24 are lifted upwardly.

As shown in FIG. 8, the cable 132 passes around a pulley 133, which is rotatably mounted on an upstanding support 134 of the extension 125 of the housing 41. The cable 132 then extends around a pulley 135, which is rotatably mounted on the bridge 10.

The cable next passes around a pulley 136, which is rotatably mounted on a bifurcated support 137. The bifurcated support 137 is fixedly secured to one end of a piston rod 138 of a hydraulic cylinder 139, which is supported by the bridge 10. The cable 132 is connected through a turnbuckle to an arm 140 of the upstanding support 134 on the extension 125 of the housing 41.

During any transverse moving of the cutting blade 16 through the transverse passage or throat 15, there is no movement of the cable 132 to cause any raising or lowering of the cutting blade 16. This is because any shortening of the cable 132 between the pulley 133 and the pulley 135 due to movement of the housing 41 and the lower saddle 83 by energization of the motor 119 results in the length of the cable 132 between the pulley 136 and the arm 140 extending the same amount and vice versa. Therefore, the cutting blade 16 remains in the position in which it cuts the material 14 during reciprocation of the cutting blade 16.

If it is desired to lift the cutting blade 16 from cutting engagement with the material 14, fluid is supplied to the hydraulic cylinder 139 to retract the piston rod 138. Accordingly, the bifurcated support 137 is moved toward the cylinder 139. When this occurs, the distance between the pulleys 135 and 136 is lengthened whereby the motor 26, the cutting blade 16, the guide 24, the frame 37, and the connected structure are lifted.

Lifting of the cutting blade 16 may be regulated or controlled in accordance with the total thickness of the material being cut. Thus, to rotate the cutting blade 16 with respect to the material 14 when a sharp corner or a notch is to be formed in the material 14, it is only necessary to have the connecting edge 19 of the cutting blade 16 clear the top of the material 14. Accordingly, by controlling the quantity of fluid supplied to the hydraulic cylinder 139, the height to which the cutting blade 16 is lifted is regulated or controlled.

The flow of fluid to the hydraulic cylinder 139 is stopped when an arm of an electric switch 141 (see FIG. 5), which is carried by the motor 26, engages an adjustable dog 142 to close the switch 141. The dog 142 is adjustable in a vertical direction by moving a knob 143 attached to the dog through a pin 144. The pin 144 extends through a slot 145 in a longitudinal member 146, which extends downwardly from the upper plate 39.

A spacer 146' also is carried by the pin 144 and has a reduced portion fitting into the longitudinal slot 145 from one side of the longitudinal member 146 while the dog 142 has a shoulder fitting into the slot 145 from the other side of the member 146. Thus, the adjustable dog 142 is held in the adjusted position within the slot 145.

The front wall 42 of the housing 41 has a scale 147 (see FIGS. 1 and 5) thereon to indicate the total thickness of the material being cut. A pointer 148, which is mounted on the pin 144 of the adjustable dog 142 and fixed to the spacer 146', cooperates with the scale 147 whereby the operator of the material cutting machine of the present invention may easily insure that the cutting blade 16 is raised to the desired height where its connecting edge 19 clears the top of the material 14.

The cutting blade 16 must have the cutting edges 17 and 19 sharpened at regular intervals to maintain the edges 17 and 19 sufficiently sharpened to cut the material 14. One suitable structure for sharpening the cutting blade 16 is shown and described in the copending patent application of Herman J. Baldwin for "Apparatus For Sharpening Reciprocating Cutting Blade of Material Cutting Machine," Ser. No. 726,697, filed May 6, 1968, and assigned to the same assignee as the assignee of the present application.

While the sharpening structure of the aforesaid Baldwin application is particularly shown and described for use with the material cutting machine, which is shown and described in the copending patent application of Edward C. Bruns for "Material Cutting Machine Having Reciprocating Blade With Two Axes Of Rotation," Ser. No. 726,658, filed May 6, 1968, and assigned to the same assignee as the assignee of the present application, the sharpening structure of the aforesaid Baldwin application may be utilized with the material cutting machine of the present invention by making the changes mentioned in the aforesaid Baldwin application. That is, it is only necessary to change the relation of a pair of grinding wheels of the sharpening structure to the cutting blade.

The sharpening structure of the aforesaid Baldwin application includes a pair of grinding wheels 149 and 150 (see FIG. 11) disposed on opposite sides of the cutting blade 16. When the cutting blade 16 is to be sharpened, one of the grinding wheels is moved into engagement with one side of each of the leading edge 17 and the cutting portions 20—22 of the connecting edge 19 of the cutting blade 16 during upward movement of the cutting blade 16 and the other of the grinding wheels is moved into engagement with the other side of the leading edge 17 and the cutting portions 20—22 of the connecting edge 19 of the cutting blade 16 when the cutting blade 16 is returned into cutting engagement with the material 14.

In order to sharpen the entire length of the cutting blade 16, it is necessary to lift the cutting blade 16 a greater distance from the material 14 than is normally required by lifting the cutting blade 16 to form a sharp corner or notch in the material 14. Thus, it is necessary to render the switch 141, which limits the lifting of the cutting blade 16 when sharpening is not performed, inactive when the cutting blade 16 is to be sharpened by the grinding wheels on the sharpening unit.

Of course, the sharpening of the cutting blade 16 occurs when the cutting blade is removed from the material 14. This may be to form a sharp corner or notch in the material 14 or to transport the cutting blade 16 from one point to another. However, the height to which the cutting blade 16 is lifted is much greater.

Since the entire pattern cut in the material 14 by the cutting blade 16 is controlled by a numerical control apparatus 151 (see FIG. 1), the instances when the cutting blade 16 must be lifted to a greater height than that required for notching or forming a sharp corner in the material 14 or for transporting the cutting blade 16 are programmed into the numerical control apparatus 151.

It should be understood that the specific pattern to be cut in the material 14 is provided as an input to the numerical control apparatus 151. This input controls the output of the control apparatus 151 in the well-known manner to produce the desired movements to cut the desired pattern in the material 14. Thus, the input to the numerical control apparatus 151 is such that when sharpening of the cutting blade 16 is to occur, the numerical control apparatus 151 causes greater lifting of the cutting blade 16 than is normally produced when the cutting blade 16 is lifted to form a notch or sharp corner in the material 14 or to be transported from one point to another.

Of course, the input to the numerical control apparatus 151 also determines when it is necessary to lift the cutting blade 16 from the material 14 to turn the cutting blade 16 with respect to its previous heading. Thus, when a small angle is to be cut in the material 14, the input to the numerical control apparatus 151 is such that rotation of the cutting blade 16 occurs without the cutting blade 16 being lifted from cutting engagement with the material 14.

The numerical control apparatus 151 also receives the electrical feedback signals from the resolvers 53 and 86. Thus, the numerical control apparatus 151 controls the amount of rotation of the motors 52 and 84 and depends upon the feedback signals from the resolvers 53 and 86 to determine when rotation of the motors 52 and 84 is to stop.

To maintain the grinding wheels 149 and 150 always properly positioned with respect to the cutting blade 16, it is necessary for the support structure for the grinding wheels to be rotated with the cutting blade 16 to maintain the desired angular relationship between the grinding wheels and the cutting blade 16. Accordingly, the grinding wheels 149 and 150 are supported on a rotary plate 152, which is rotatably mounted on the fixed grinding wheel frame 44.

The rotary plate 152 has an orbiting stud 153 (see FIG. 2) fixed thereto for rotation therewith. The orbiting stud 153 carries a grinding wheel support frame 154 thereon for rotation therewith. A spring loaded detent (not shown) on the frame 154 cooperates with a flat portion of the stud 153 to hold the frame 154 so that the grinding wheels 149 and 150 are spaced from the cutting blade 16 (see FIG. 11) as more particularly shown and described in the aforesaid Baldwin application.

As more particularly shown and described in the aforesaid Baldwin application, the rotary plate 152 is rotated by the motor 52, which also rotates the cutting blade 16. Accordingly, the rotary plate 152 is rotated the same amount as the cutting blade 16 whereby the grinding wheels 149 and 150 maintain their desired spaced relationship to the cutting blade 16 during any rotation of the cutting blade 16.

Since the rotary plate 152 is rotatably mounted in the nonrotating grinding wheel frame 44, which does not move vertically, a ball spline 155 is rotatably mounted in the frame 44 and is driven by the pinion gear 59 through an idler gear 156 (see FIG. 22) and a gear 157 on a ball spline driver 158, which slides vertically on the ball spline 155. This permits the pinion gear 59 to move vertically relative to the spline 155 while still rotating the spline 155. It should be understood that both the gears 156 and 157 are rotatably mounted in the gear box 51.

The lower end of the spline 155 has a pinion gear 159 fixedly attached thereto. The pinion gear 159 drives a bull gear 160 on the rotary plate 152 through an idler gear 161, a pinion gear 162, a shaft 163, and a pinion gear 164. The idler gear 161 is fixedly secured to a shaft 165, which is rotatably mounted in the grinding wheel frame 44, and the pinion gear 162 is fixedly connected to the shaft 163, which also is rotatably mounted in the grinding wheel frame 44. The shaft 163 also has the pinion gear 164, which meshes with the bull gear 160 mounted thereon. Accordingly, energization of the motor 52 not only causes rotation of the cutting blade 16 but also rotates the rotary plate 152 whereby the grinding wheels 149 and 150 maintain their desired angular relation to the cutting blade 16.

Thus, when sharpening of the cutting blade 16 is desired, it is necessary to pivot the frame 154 about the axis of the orbiting stud 153 by overcoming the detent. Of course, the frame 154 still rotates with the stud 153 when the stud 153 is rotated with the rotary plate 152.

A pair of solenoids 166 and 167 (see FIG. 11) is connected to opposite ends of the grinding wheel support frame 154 as more particularly shown and described in the aforesaid Baldwin application. Thus, energization of one of the solenoids causes the frame 154 to pivot in one direction about the axis of the orbiting stud 153 while energization of the other solenoid causes pivoting of the frame 154 about the axis of the orbiting stud 153 in the opposite direction. The solenoids are supported by the rotary plate 152 and rotate therewith.

When sharpening of the cutting blade 16 is to occur, the numerical control apparatus 151 not only causes energization of a motor 168 (see FIG. 2) to produce rotation of the grinding wheels but also energizes one of the solenoids before lifting of the cutting blade 16 occurs. As a result, one of the grinding wheels is moved into engagement with the side of the cutting blade 16 adjacent thereto to sharpen both the leading edge 17 and the cutting portions 20—22 of the connecting edge 19 as the cutting blade 16 is lifted upwardly.

The one grinding wheel is removed from engagement with the cutting blade 16 after the cutting blade 16 completes its upward movement. It is necessary to energize the other of the solenoids and deenergize the one solenoid before downward movement of the cutting blade 16 occurs. Thus, when the cutting blade 16 moves downwardly, the other of the grinding wheels is disposed for engagement with the side of the cutting blade 16 adjacent thereto.

It should be understood that the grinding wheel support frame 154 rotates with the stud 153 as the stud 153 rotates with the rotary plate 152 during any rotation of the cutting blade 16 to change its heading. This change of the heading may be to form a notch or a sharp angle with respect to the previous cut formed in the material 14 or may be produced when the cutting blade 16 is moved from one point of the pattern from which no further continuous cut may be formed to where the next cut of the pattern is to occur. This rotation of the frame 154 occurs even though the frame 154 has been pivoted with respect to the axis of the orbiting stud 153 by energization of one of the solenoids.

When the cutting blade 16 has returned into cutting engagement with the material 14, the other solenoid is deenergized whereby the frame 154 returns to the position in which the grinding wheels are spaced from the cutting blade 16. At the same time, the motor 168 is deenergized to stop rotation of the grinding wheels.

Additional support means for the elongated member 69 is provided by a U-shaped member 169 (see FIGS. 3 and 11), which is fixedly secured to a bracket 170. The bracket 170 is fixedly secured to the lower surface of the rotary plate 152.

Accordingly, since the rotary plate 152 rotates whenever the cutting blade 16 is rotated, the U-shaped member 169 also rotates whenever the cutting blade 16 is rotated. Thus, this additional support means maintains the proper alignment with the elongated member 69 and the guide 24 to provide additional support for the guide 24.

Considering the operation of the present invention, the material 14 is disposed on one of the endless bands 11 and 12 initially. It will be assumed that this is the band 11.

The movement in a longitudinal direction of the material 14 relative to the cutting blade 16 and the transverse movement of the cutting blade 16 relative to the material 14 is controlled by the numerical control apparatus 151. As previously mentioned, the numerical control apparatus 151 also determines when the cutting blade 16 is lifted from engagement with the material 14 and rotated relative thereto or merely lifted from engagement with the material 14 and transported to another point before being returned into cutting engagement with the material 14.

The numerical control apparatus 151 produces the desired pattern on the material 14, which may be plurality of layers of cloth, for example. As previously mentioned, this specific pattern is provided as an input to the apparatus 151. This input includes signals as to when the cutting blade 16 is to be lifted from cutting engagement with the material 14 and transported to another point; this would occur when recutting of the material would be required to reach the next cutting point in the material 14 to produce the desired pattern.

With the material 14 disposed on the endless band 11, the motor, which drives the endless bands 11 and 12 in unison, is energized by the numerical control apparatus 151 to advance the material 14 longitudinally until the starting point of the pattern of the material 14 is disposed beneath the cutting blade 16 to receive the cutting blade 16 for cutting engagement therewith. The numerical control apparatus 151 also has positioned the cutting blade 16 at the desired heading and at the desired transverse position in the transverse passage 15. Accordingly, cutting of the material 14 begins by moving the blade 16 downwardly into cutting engagement with the material 14.

When it is desired to change the heading of the blade 16 to produce a cut at a sharp angle relative to the prior cut in the material 14, the blade 16 must be lifted from cutting engagement with the material 14 to change the heading of the blade 16. After rotation of the cutting blade 16 has been completed to provide the new heading for the cutting blade 16, it is necessary to return the cutting blade 16 into cutting engagement with the material 14.

When the pattern has an internal notch formed therein, for example, this is one situation in which recutting would be required in order to return to the point in the material 14 at which further cutting of the pattern in the material 14 would occur. Accordingly, the cutting blade 16 would again be lifted at this time and transported from the completion of the internal notch in the material 14 to the next point in the material 14 at which the pattern is to be cut.

Referring to FIGS. 15 to 21, there are shown the various movements of the cutting blade 16 to cut an internal notch in the material 14 and then continue cutting along the axis of the prior cut. The notch will be cut at 90° to the prior cut.

Figure 16:
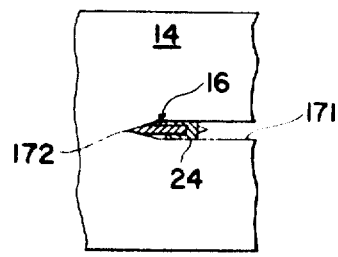
FIG. 16 is a top plan view, partly in section, showing the cutting blade forming a cut in the material and taken along line 16—16 of FIG. 15.

As shown in FIGS. 15 and 16, the cutting blade 16 has created a longitudinal cut 171 in the material 14. The cut 171 is made by moving the material 14 from left to right in FIGS. 15 and 16 while the cutting blade 16 is reciprocated by the motor 26. When the leading edge 17 of the cutting blade 16 has moved relative to the material 14 to point 172 of the longitudinal cut 171 at which it is desired to form the internal notch in the material 14 to form the desired pattern, further advancement of the material 14 through driving the endless bands 11 and 12 in unison is stopped by the numerical control apparatus 151.

The hydraulic cylinder 139 (see FIG. 8) is then actuated to move the bifurcated support 137 toward the left in FIG. 8. The amount of movement of the bifurcated support 137 toward the hydraulic cylinder 139 determines the amount of lifting of the cutting blade 16 from the material 14. As previously mentioned, it is necessary to lift the cutting blade 16 from cutting engagement with the material 14 but it is not necessary to lift the cutting blade beyond a position at which the connecting edge 19 of the cutting blade 16 is no longer in cutting engagement with the material 14.

Accordingly, as previously mentioned, the adjustable dog 142 is positioned in accordance with the total thickness of the material 14 being cut. This causes the switch 141 to be actuated to stop the supply of hydraulic fluid to the cylinder 139 whereby the amount of lifting of the cutting blade 16 is regulated or controlled. Of course, the signal due to actuation of the switch 141 is supplied to the numerical control apparatus 151, which actually regulates the supply of fluid to the hydraulic cylinder 139.

The movement of the piston rod 138 of the hydraulic cylinder 139 results in the cutting blade 16 being removed from cutting engagement with the material 14 as shown in FIG. 17. During this lifting of the cutting blade 16, the motor 26 continues to reciprocate the cutting blade 16.

Figure 18:
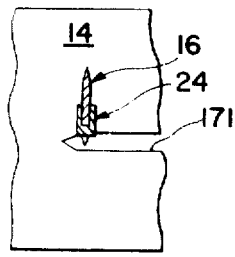
FIG. 18 is a view, similar to FIG. 16, but showing the cutting blade rotated 90° from the position of FIG. 16 and the cutting blade and the guide being advanced transversely to the cut in the material.

With the cutting blade 16 and the guide 24 removed from engagement with the material 14, the cutting blade 16 and the guide 24 are rotated about the axis of rotation, which is adjacent the leading edge 17 of the cutting blade 16, to the position of FIG. 18 wherein the cutting blade 16 now has the desired heading to form the internal notch. In this example, the cutting blade 16 is rotated 90° clockwise (as viewed in FIGS. 16 and 18) from the position of FIG. 16 to the position of FIG. 18.

At the same time that rotation of the cutting blade 16 occurs, it is necessary to advance the cutting blade 16 and the guide 24 substantially perpendicular to the cut 171 until the cutting blade 16 and the guide 24 are disposed in the position of FIG. 18. This transverse movement is accomplished through actuation of the motor 119 by the numerical control apparatus 151. When this occurs, the housing 41 and the connected structure and the lower saddle 83 and the connected structure are both moved transversely through the passage 15.

When the numerical control apparatus 151 senses that the cutting blade 16 and the guide 24 have been moved to the position of FIG. 18, the piston rod 138 is actuated to return the bifurcated support 137 to the position of FIG. 8. This lowers the cutting blade 16 to return it into cutting engagement with the material 14.

Because the connecting edge 19 of the cutting blade 16 is sharpened along the portions 20, 21, and 22, cutting of the material 14 occurs as soon as the connecting edge 19 engages the material 14. As the connecting edge 19 of the cutting blade 16 advances downwardly through the material 14, the guide 24 follows the piercing cut of the connecting edge 19 of the cutting blade 16 to also pass through the material 14. As previously mentioned, the sides 67 and 68 of the guide 24 are preferably sharpened at their lower ends for the guide 24 to pass through the material 14.

When the cutting blade 16 has returned to its lowermost position wherein the connecting edge 19 of the cutting blade 16 is disposed within the support block 80, a limit switch (not shown), which is carried by the frame 37, is closed through engagement of its arm with a dog (not shown) on the grinding wheel frame 44. This transmits a signal to the numerical control apparatus 151 to allow the numerical control apparatus 151 to produce the next operation.

It will be assumed that the length of a notch 173, which is cut within the material 14, is substantially the same length as the length of the cutting surfaces of the cutting blade 16. Accordingly, no transverse movement of the cutting blade 16 and the guide 24 would be required. Of course, if the notch 173 were to be longer than the length of the lower cutting surfaces of the cutting blade 16, then it would also be necessary to advance the cutting blade 16 transversely to the material 14 through energization of the motor 119.

After the notch has been formed in the material 14, it will be assumed that it is then desired to continue cutting the material as a continuation of the longitudinal cut 171. Accordingly, after the numerical control apparatus 151 has received a signal to indicate that the notch 173 has been formed because of the complete downward movement of the cutting blade 16 until it is disposed within the support block 80, the numerical control apparatus 151 then causes the motor 119 to be reversed in direction whereby the cutting blade 16 and the guide 24 are moved transversely through the passage 15 in the opposite direction to that which occurred when the cutting blade 16 and the guide 24 moved to the position of FIG. 18.

At the same time that the cutting blade 16 is moved transversely through the passage 15, the cutting blade 16 and the guide 24 are rotated counterclockwise about the axis of rotation by energization of the motors 52 and 84 through a signal from the numerical control apparatus 151. By energizing the motor 84 simultaneously with the motor 52, this insures that the lower saddle 83 rotates when the cutting blade 16 and the guide 24 rotate even though the cutting blade 16 and the guide 24 are not disposed within the support block 80. This maintains the support block 80 properly aligned with the cutting blade 16 and the guide 24. This permits the guide 24 and the cutting blade 16 to again easily return into position within the support block 80 when the cutting blade 16 and the guide 24 are returned into a position within the support block 80.

At the same time that the cutting blade 16 and the guide 24 are rotated to be disposed again in alignment with the longitudinal cut 171 and the cutting blade 16 is moved transversely through the passage 15, the cutting blade 16 is advanced relative to the material 14 in a longitudinal direction through movement of the material 14 from left to right as viewed in FIG. 19 through movement of the endless bands 11 and 12 in unison. This movement is controlled by the numerical control apparatus 151.

When the cutting blade 16 is disposed as shown in FIG. 20, the cutting surfaces of the cutting blade 16 are disposed so that downward movement of the cutting blade 16 and the guide 24 results in a continuation of the longitudinal cut 171 through the material 14.

Accordingly, the continuation of the longitudinal cut 171 through the numerical control apparatus 151 causing downward movement of the cutting blade 16 into cutting engagement with the material 14 when the cutting blade 16 is disposed in the position of FIG. 20 is shown in FIG. 21. Thus, the longitudinal cut 171 is continued beyond the notch 173. The downward movement of the cutting blade 16 is controlled through the numerical control apparatus 151 providing a signal to control the flow of fluid to the hydraulic cylinder 139 so that the bifurcated support 137 is moved away from the hydraulic cylinder 139 to the position of FIG. 8 whereby the cutting blade 16 is returned into cutting engagement with the material 14.

Of course, advancement of the cutting blade 16 from the position of FIG. 20 to the position of FIG. 21 can only occur after the cutting blade 16 has returned to the position in which its lower end and the lower end of the guide 24 are disposed within the support block 80. This is provided by the limit switch on the frame 37 being closed by engagement with the dog on the grinding wheel frame 44. This transmits a signal to the numerical control apparatus 151 to allow the numerical control apparatus 151 to advance the cutting blade 16 relative to the material 14. In the particular cut shown in FIG. 21, the material 14 is moved from the left to the right relative to the cutting blade 16 through actuation of the endless bands 11 and 12 in unison.

As previously mentioned, sharpening of the cutting blade 16 occurs during one of the times when the cutting blade 16 is lifted out of cutting engagement with the material 14. When this occurs, the switch 141 is no longer effective to supply the signal to the numerical control apparatus 151 for stopping flow of fluid to the hydraulic cylinder 139. Instead, the switch 141 is rendered inactive, and the flow of fluid to the hydraulic cylinder 139 continues until a switch 174 (see FIG. 5), which is carried by the motor 26, is engaged by a dog 175, which is adjustably supported from the upper plate 39 of the housing 41. This results in the cutting blade 16 being lifted to the desired maximum height whereby the leading edge 17 and the connecting edge 19 of the cutting blade 16 may be sharpened by the grinding wheels 149 and 150.

As previously mentioned, one of the grinding wheels is effective to sharpen the cutting blade 16 when the cutting blade 16 is moved upwardly. The other of the grinding wheels is utilized to sharpen the cutting blade 16 during the downward movement of the cutting blade 16. Accordingly, no downtime of the material cutting machine of the present invention is required for sharpening the cutting blade 16. Instead, it is only necessary to raise the cutting blade 16 higher than in most cycles of raising and lowering. The numerical control apparatus 151 controls energization of the motor 168 and the solenoids 166 and 167, which pivot the grinding wheel support frame 154 about the axis of the orbiting stud 153, to insure proper correlation between the grinding wheels 149 and 150 and the cutting blade 16.

The electrical supply to the motor 168 and the solenoids 166 and 167, which pivot the frame 154, is supplied through three slip rings (not shown) on the grinding wheel frame 44 cooperating with three brushes (not shown), which are mounted on the rotary plate 152, as more particularly shown and described in the aforesaid Baldwin application. Thus, electrical current is always available for the motor 168 and the solenoids 166 and 167.

While the foregoing description of the material cutting machine used in carrying out the method of the present invention has described cutting an internal notch at a 90° angle in the material 14, it should be understood that the cutting blade 16 may cut circles in the material 14 or form any angle relative to the previous cut in the material. When cutting a circle, the blade 16 has the leading edge 17 disposed tangent to the circle being formed. This insures that a true circle is cut in the material 14.

It is not always necessary to lift the cutting blade 16 from engagement with the material 14 to form a cut at an angle relative to the previous cut. For example, if it is desired to change the angle of the cutting blade 16 only 5°, this may be accomplished by merely rotating the cutting blade structure without lifting the cutting blade 16 from cutting engagement with the material 14. At this small angle, the slight curvature between the two cuts of the material 14 would be so small that it could not be readily distinguished from a sharp angle cut, which is produced when the cutting blade 16 is lifted from cutting engagement with the material 14 before the heading of the cutting blade 16 is changed.

Furthermore, in certain lightweight materials, the heading of the cutting blade 16 could be changed substantially without having to remove it from cutting engagement with the material 14. Of course, this would be utilized only where a sharp corner is not desired but a curved corner is permissible, and the waste of material is immaterial.

As previously mentioned, the numerical control apparatus 151 has the desired pattern programmed therein as an input. This input determines whether rotation of the cutting blade 16 may occur without the cutting blade 16 being lifted from cutting engagement with the material 14. The type of material, the thickness of each layer of material, and the total thickness of the material as well as the desired configuration to be cut in the material determines whether the cutting blade 16 must be lifted from the material 14 before it is rotated. If the material 14 is relatively heavy, any slight rotation of the cutting blade 16 may damage the cutting blade 16.

Because the axis of rotation of the cutting blade 16 is adjacent the leading edge 17, any force exerted by the material 14 on the cutting blade 16 is reduced in comparison with any side thrust produced when the cutting blade 16 is rotatable about an axis adjacent the trailing edge 18. Therefore, by having the axis of rotation of the cutting blade 16 adjacent the leading edge 17, any misalignment of the cutting blade 16 from its desired heading is substantially eliminated by the material cutting machine of the present invention.

The heading of the cutting blade 16 at any instant may be obtained through mounting a scale 176 (see FIG. 2) on the housing 41. A pointer 177, which cooperates with the scale 176, may be attached to the rotary plate 152. Accordingly, the pointer 177 rotates with the cutting blade 16 to indicate its heading.

Another form of cutting blade for use with the material cutting machine for carrying out the method of the present invention is shown in FIGS. 23 and 24. There is shown a cutting blade 178 disposed within a guide 179. The cutting blade 178 includes a leading edge 180, a trailing edge 181, and a connecting edge 182. The leading edge 180 and the connecting edge 182, which connects the bottom ends of the leading edge 180 and the trailing edge 181, are sharpened. Thus, the cutting blade 178 is capable of piercing the material 14 in the same manner as the cutting blade 16. However, the connecting edge 182 does not extend rearward of the guide 179 as does the connecting edge 19 of the cutting blade 16 with respect to the guide 24.

Instead, the guide 179 has its bottom edge or surface 183 sharpened to a point as shown in FIG. 23. Accordingly, the guide 179 must have its edge or surface 183 sharpened to permit penetration of the material 14 by the guide 179 through piercing the material 14. Thus, while sharpening of the guide 24 was preferable, the edge 183 of the guide 179 must be sharpened to permit piercing of the material 14. Furthermore, edge 184 of the guide 179 also is preferably sharpened.

With the cutting blade 178 and the guide 179 of the embodiment of FIGS. 23 and 24, the lower end of the cutting blade 178 receives substantial support from the guide 179 during reciprocation. As shown in FIG. 3, the reciprocation of the cutting blade 16 results in the lower end of the cutting blade 16 not being supported by the guide 24 during reciprocation of the cutting blade 16. Accordingly, the cutting blade 16 is preferably utilized when the total thickness of the material 14 is relatively small.

Referring to to FIGS. 25 and 26, there is shown still another form of cutting blade and guide for use with the material cutting machine for carrying out the method of the present invention. In this embodiment, a cutting blade 185 is slidably disposed within a guide 186. The cutting blade 185 has the bottom end of its leading edge 187 and its trailing edge 188 connected by a connecting edge, which comprises a first portion 189 and a second portion 190. The leading edge 187 of the cutting blade 185 is sharpened.

The guide 186 has its lower end or surface sharpened to a tip 191 whereby the tip will pierce the material 14 when the guide 186 is moved into the material 14. Thus, it is not necessary for the cutting blade 185 to have the second portion 190 of its connecting edge sharpened since the piercing of the material 14 is accomplished by the tip 191 of the guide 186. However, the first portion 189 of the connecting edge must be sharpened to pierce the material 14.

The guide 186 continuously supports the lower end of the cutting blade 185 during its reciprocation as clearly shown in FIG. 25. Thus, the maximum downward position of the cutting blade 185 during reciprocation is shown by the solid line position while the maximum upward movement of the cutting blade 185 during reciprocation is shown by the dotted line position. Thus, the guide 186 supports the cutting blade 185 during reciprocation.

With each of the cutting blades 16, 178, and 185 and their cooperating guides, piercing of the material 14 is accomplished through either the cutting blade having its lower edge sharpened or both the cutting blade and the guide having their lower edges sharpened. In any of these embodiments, the cutting blade is adapted to pierce the material 14.

While the material cutting machine for carrying out the method of the present invention has been described as having the movable endless bands 11 and 12 move the material 14 longitudinally relative to the cutting blade 16, it should be understood that the endless bands 11 and 12 could be replaced by a support table in which a single flexible band does not move but has the transverse passage 15 therein. One suitable example of this type of support table is shown and described in U.S. Pat. No. 3,262,348 to Wiatt et al. In this type of arrangement, the bridge 10 would have to be movable in a longitudinal direction to move the cutting blade 16 longitudinally relative to the material 14. The closure structure, which closes the transverse passage 15, also would have to be supported by the movable bridge 10 rather than the side plates of the table structure.

It also should be understood that the endless bands 11 and 12 of the support table of the aforesaid Wiatt et al. patent could be moved transversely relative to the cutting blade 16 rather than moving the cutting blade 16. It is only necessary for the material 14 and the cutting blade 16 to have both relative transverse and longitudinal movement between the material 14 and the cutting blade 16 to produce the desired results of the material cutting machine of the present invention.

While the cutting blade reciprocating structure has been shown as disposed above the material 14, it should be understood that this structure could be disposed beneath the endless bands 11 and 12 with the cutting blade 16 reversed. It is only necessary that the cutting blade 16 be reciprocated and be capable of being rotated.

The material 14 has been shown and described as a plurality of similar layers of the same material. However, it should be understood that the material 14 could comprise layers of different materials with the layers having the same or different thicknesses or layers of the same material of different thicknesses.

An advantage of this invention is that it reduces the overall cutting time of a material cutting machine. Another advantage of this invention is that it eliminates the entrance cut problems. A further advantage of this invention is that it eliminates the need for structure to limit sidewise movement of the material during cutting of the material. Still another advantage of this invention is that it permits rapid point to point movement of the cutting blade during cutting of the material.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What I claim is:

1. A method for forming a pattern in material with a reciprocating cutting blade having cutting surfaces on both its leading edge and an edge connecting the ends of its leading and trailing edges remote from its reciprocating means in which relative longitudinal and transverse movement between the material and the cutting blade may occur, said method comprising:

positioning the material in a plane substantially perpendicular to the reciprocating plane of the cutting blade;

disposing the cutting blade out of cutting engagement with the material but at the start of the pattern;

inserting the cutting blade into the material at the starting point of the pattern by piercing the material and passing the cutting blade completely through the material;

supporting the cutting blade throughout the portion in cutting engagement with the material and a portion extending beyond the side of the material opposite to that in which the cutting blade is inserted by piercing the material when the cutting blade is in cutting engagement with the material;

and removing the cutting blade from cutting engagement when cutting of a particular portion of the pattern that is disconnected from the remainder of the pattern is completed.

2. The method according to claim 1 including:

removing the cutting blade from cutting engagement with the material being cut when the pattern has a sharp angle;

rotating the cutting blade to position its leading edge at the desired angle of the new cut relative to the previous cut in the material;

moving the cutting blade relative to the cut in the material to dispose the cutting blade so that the cutting surface of its connecting edge will form a continuation of the previous cut in the material;

and inserting the cutting blade into the material again by piercing the material.

3. The method according to claim 2 in which the rotation of the cutting blade and the movement of the cutting blade relative to the cut in the material occur simultaneously.

4. The method according to claim 2 in which the cutting blade is rotatable to any angle through 360° to position its cutting surface at the desired angle of the new cut relative to the previous cut in the material.

5. The method according to claim 2 including rotating the cutting blade from the position of its previous cut to the position of its new cut directly from the previous cut so that the minimum amount of rotation of the cutting blade occurs.

6. The method according to claim 2 including continuously reciprocating the cutting blade.

7. A method for forming a pattern in material with a reciprocating cutting blade having cutting surfaces on both its leading edge and an edge connecting the ends of its leading and trailing edges remote from its reciprocating means in which relative longitudinal and transverse movement between the material and the cutting blade may occur, aid method comprising:

positioning the material in a plane substantially perpendicular to the reciprocating plane of the cutting blade;

disposing the cutting blade out of cutting engagement with the material but at the start of the pattern;

inserting the cutting blade into the material at the starting point of the pattern by piercing the material;

removing the cutting blade from cutting engagement when cutting of a particular portion of the pattern that is disconnected from the remainder of the pattern is completed;

removing the cutting blade from cutting engagement with the material being cut when the pattern has a sharp angle;

rotating the cutting blade to position its leading edge at the desired angle of the new cut relative to the previous cut in the material when the pattern has the sharp angle;

moving the cutting blade relative to the cut in the material to dispose the cutting blade so that the cutting surface of its connecting edge will form a continuation of the previous cut in the material;

and inserting the cutting blade into the material again by piercing the material.

8. The method according to claim 7 including supporting the cutting blade on the side of the material opposite to the side of the material into which the cutting blade is moved into and out of engagement with the material at least when the cutting blade is in cutting engagement with the material.

9. A method for cutting a pattern in a material with a cutting blade having a cutting surface movable into and out of cutting engagement with the material in which relative longitudinal and transverse movement between the material and the cutting blade may occur, said method comprising:

removing the cutting blade from cutting engagement with the material whenever the pattern requires an angular relation between the previous cut in the material and a new cut in the material that cannot be obtained by rotating the cutting blade when the cutting blade is in cutting engagement with the material;

rotating the cutting blade to position its cutting surface at the desired angle of the new cut relative to the previous cut of the material;

simultaneously moving the cutting blade relative to the previous cut in the material during rotation of the cutting blade to dispose the cutting blade so that its cutting surface will form a continuation of the cut in the material when the cutting blade is returned into cutting engagement with the material;

and returning the cutting blade into cutting engagement with the material.

10. The method according to claim 9 in which the cutting blade is rotatable to any angle through 360° to position its cutting surface at the desired angle of the new cut relative to the previous cut in the material.

11. The method according to claim 9 including rotating the cutting blade from the position of its previous cut to the position of its new cut directly from the previous cut so that the minimum amount of rotation of the cutting blade occurs.

12. The method according to claim 9 including supporting the cutting blade on the side of the material opposite to the side of the material into which the cutting blade is moved into and out of engagement with the material at least when the cutting blade is in cutting engagement with the material.

13. The method according to claim 9 including continuously reciprocating the cutting blade.

14. The method according to claim 9 including supporting the cutting blade at least throughout the portion of the cutting blade disposed in cutting engagement with the material when the cutting blade is in cutting engagement with the material and a portion of the cutting blade extending beyond the material on the side opposite to that into which the cutting blade is inserted by piercing the material.